UNITED STATES PATENT OFFICE 2,172,572

3-HYDROXY-DIPHENYLENE OXIDES AND PROCESS OF PREPARING THEM

Karl Zahn and Kurt Schimmelschmidt, Frankfort-on-the-Main-Hochst, Germany, assignors to General Aniline Works, Inc., New York, N. Y., a corporation of Delaware No Drawing. Application January 15, 1937, Serial No. 120,826. In Germany January 22, 1936

6 Claims. (Cl. 260—346)

The present invention relates to 3-hydroxy-diphenylene oxides and to a process of preparing them; more particularly it relates to compounds of the following general formula:

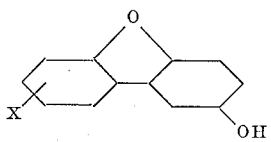

wherein X stands for a member of the group consisting of methyl, chlorine, hydroxy, methoxy and amino.

We have found that the compounds of the following general formula:

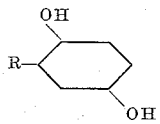

wherein R represents a phenyl radical carrying in ortho-position to the linkage a group capable of being exchanged and may contain further substituents, are transformed by treatment with an agent having an alkaline action into 3-hydroxy-diphenylene oxide or substitution products thereof. There is, for instance, obtained by melting 2'-chloro-2.5-dihydroxydiphenyl with caustic potash the 3-hydroxy-diphenylene oxide. The reaction is illustrated by the following formulae:

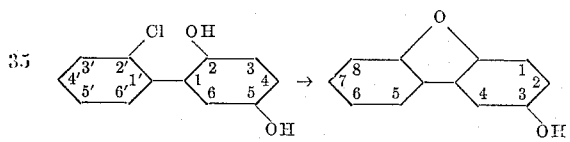

The smooth course of this ring closure could in no way be foreseen, since according to the statements of the art (Berichte der Deutschen Chemischen Gesellschaft, vol. 34, 1901, page 1662) it was to be expected that the 3-hydroxy-diphenylene oxide would be split up to form the 2.5.2'-trihydroxydiphenyl when melted with caustic potash.

The products used as parent materials may be obtained by reducing to the corresponding hydroquinones the substituted phenylquinones obtainable by the process described in German patent specification No. 508,395, namely by coupling with benzoquinone the diazo-compound of any amine of the benzene series containing in ortho-position an exchangeable radical.

The ring closure of these compounds to the corresponding diphenylene oxide derivatives with the aid of agents having an alkaline action may be conducted in various manners, for instance, by melting with a caustic alkali or by heating with an alkali metal hydroxide or an alkali metal carbonate solution, advantageously to temperatures of from about 170° C. to about 270° C.

By the present process it is possible to make not only the 3-hydroxy-diphenylene oxide itself, but also a series of substitution products of this compound from products which are easily accessible on an industrial scale; the process, therefore, represents a particular technical advance.

The compounds obtained are valuable intermediates for the manufacture of dyestuffs.

The following examples serve to illustrate the invention, but they are not intended to limit it thereto; the parts are by weight.

(1) 1 part of 2'-chloro-2.5-dihydroxydiphenyl is introduced into a melt of 10 parts of caustic potash and 1 part of water. Thereby the potassium compound of the parent material is formed and appears in the melted caustic potash in the form of a yellow-brown crystalline product. The whole is further heated until this product has disappeared and the potassium compound of 3-hydroxy-diphenylene oxide has separated on the surface of the melt in the form of a dark body. The melt is then dissolved in water and the solution acidified. Thereby the condensation product formed separates in the form of fine needles which, when recrystallised from toluene, melt at 135° C. The 3-hydroxy-diphenylene oxide when mixed with that prepared according to the process of German patent specification No. 606,350 shows no depression of its melting point.

(2) 500 parts of 2'-chloro-2.5-dihydroxy-diphenyl are heated with 1400 parts of caustic soda solution of 40° Bé. and 20 parts of sodium hydrosulphite (in order to avoid the autoxidation of the alkaline solution) in an iron autoclave for one hour to 260°–270° C. (the pressure rises to 30 atmospheres). After cooling, the contents of the autoclave constitute a white semi-solid mass, the sodium compound of the 3-hydroxy-diphenylene-oxide. By dissolving it in water and acidifying the solution, a crude 3-hydroxy-diphenylene oxide having a melting point of 130°–131° C. is obtained.

(3) 160 parts of 4'-methyl-2'-chloro-2.5-dihydroxy-diphenyl (melting at 148° C. and obtainable by reaction of the diazo compound of 4-methyl-2-chloro-1-aminobenzene with benzoquinone and reduction of the 4'-methyl-2'-chlorophenyl-benzoquinone obtained) are melted at 70°–100° C. with 200 parts of crystallised sodium acetate, 10 parts of sodium hydrosulphite and 200 parts of caustic potash, and there are introduced into the melt 400 parts of caustic potash, while permanently raising the temperature. At 180° C., a vivid reaction sets in and the temperature of the melt rises to 210°–220° C. The whole is then further heated for a short time to 240°–250° C. in order to complete the reaction. The melt is then introduced into water and the solution acidified while cold. 140 parts of the crude product melting at 146° to 147° C. are obtained. From toluene the 7 - methyl - 3 - hydroxy-diphenylene oxide, which has hitherto not been described in the literature, crystallises in the form of colourless needles melting at 147°–148° C.

(4) 100 parts of 2'.4'-dichloro-2.5-dihydroxy-diphenyl (melting at 182° C. to 183° C. and obtainable by reaction of the diazo compound of the 2.4-dichloraniline with benzoquinone and reduction of the 2'.4'-dichlorophenyl-benzoquinone obtained) are mixed with 100 parts of water, 100 parts of caustic potash and 10 parts of sodium hydrosulphite and the whole is liquefied by heating to about 120° C. Thereupon, there are introduced further 200 parts of caustic potash, while raising the temperature; by this process the melt solidifies finally at about 160° C. On further heating, liquefaction sets slowly in at 170° C., and at 190°–195° C. the whole melt has become thinly liquid and boils. As soon as foaming is no longer observed, the reaction is finished. The melt is introduced into water, the aqueous solution is clarified and acidified. The 7-chloro-3-hydroxy-diphenylene oxide hitherto not described in the literature, which crystallises from benzene in the form of colourless crystals melting at 167°–168° C., is obtained.

(5) 100 parts of 2'.4'-dichloro-2.5-dihydroxy-diphenyl are heated for 2 hours to 260°–270° C. with 400 parts of caustic soda solution of 40° Bé. and 20 parts of sodium hydrosulphite, in an iron autoclave. The contents of the autoclave are diluted with water and the whole is acidified while cold. The 3.7-dihydroxy-diphenylene oxide is obtained which crystallises from chlorobenzene in the form of colourless crystals melting at 192°–193° C. The same product is obtained if the melting operation with caustic potash described in Example 4 is performed with only 50 parts of water and the temperature is raised to 240°–250° C., or if the 7-chloro-3-hydroxy-diphenylene oxide obtained according to Example 4 is submitted to a further melting with caustic potash at 240°–250° C.

(6) 100 parts of 4'-methoxy-2'-chloro-2.5-dihydroxy-diphenyl (melting at 186° C. to 188° C. and obtainable by reaction of the diazo compound from 2-chloro-4-methoxy-1-aminobenzene with benzoquinone and reduction of the 4'-methoxy-2'-chloro - phenyl - benzoquinone obtained) are heated, while stirring, with 100 parts of crystallised sodium acetate and 300 parts of caustic potash. At 170° C., a vivid reaction sets in and at 210°–220° C. the reaction is finished. The reaction product is dissolved in water and the aqueous solution is acidified; by this process the 7-methoxy-3-hydroxy-diphenylene oxide hitherto not described in the literature is obtained, it crystallises from toluene in the form of colourless crystals melting at 151°–152° C.

(7) 100 parts of 2'.5'-dichloro-2.5-dihydroxydiphenyl (melting at 173°–174° C. and obtainable by reduction of the 2'.5'-dichlorophenyl-benzoquinone, which is obtained by reaction of diazotised 2.5-dichloraniline with benzoquinone) are melted, at 220°–230° C., together with 200 parts of sodium acetate, 600 parts of caustic potash and 20 parts of sodium hydrosulphite. The melt is introduced into water, the whole is acidified and the 6-chloro-3-hydroxy-diphenylene oxide which has separated is purified by distillation under reduced pressure of by recrystallisation from toluene. It melts at 177°–178° C.

(8) At 220°–230° C., 100 parts of 2'-chloro-5'-methyl - 2.5 - dihydroxy - diphenyl (melting at 163°–164° C. and obtainable by reaction of diazotised 4-chloro- 3 -amino-1-methylbenzene with benzoquinone to form the 2'-chloro-5'-methyl-phenylbenzoquinone which melts at 121°–122° C. and subsequent reduction) are introduced into a melt of 200 parts of crystallised sodium acetate, 600 parts of caustic potash and 20 parts of sodium hydrosulphite and the whole is heated to 240° C. in order to complete the reaction. After working up, the 6-methyl-3-hydroxy-diphenylene oxide is obtained in the form of colourless needles melting at 160°–161° C.

(9) 100 parts of 5'-methoxy-2'-chloro-2.5-dihydroxy-diphenyl (melting at 133°–134 C. and obtainable by reduction of the 5'-methoxy-2'-chlorophenylbenzoquinone melting at 131°–132° C. which is obtained from diazotised 3-amino-4-chloro - 1 - methoxybenzene and benzoquinone) are melted together with 200 parts of sodium acetate, 20 parts of sodium hydrosulphite and 600 parts of caustic potash. In order to complete the reaction, the whole is further heated to 260°–280° C. Under these conditions the methoxy group is saponified and, after working up, the 3.6-dihydroxy-diphenylene oxide melting at 243°–244° C. is obtained.

(10) At 200°–240° C., 30 parts of 4'-amino-2'-chloro - 2.5 - dihydroxy-diphenyl (obtainable by reduction of the 4'-nitro-2'-chlorophenyl-benzoquinone which is formed by reaction of diazotised 4-nitro-2-chloraniline with benzoquinone) are melted with 60 parts of sodium acetate, 10 parts of sodium hydrosulphite and 180 parts of caustic potash. The melt is introduced into water, the alkaline solution is rendered neutral by means of acid, then filtered and the filtrate is rendered feebly acid to litmus paper by means of acetic acid. The 7-amino-3-hydroxy-diphenylene oxide which separates melts after recrystallisation from chlorobenzene at 200°–201° C. It dissolves easily in dilute caustic soda solution and in dilute acids, yields with hydrochloric acid a colourless hydrochloride in the form of very beautiful crystals and with acetic anhydride the 7-acetamino-3-hydroxy-diphenylene oxide melting at 242°–243° C.

(11) If the 2'.3' - dichloro - 2.5 - dihydroxydiphenyl (which melts at 170°–172° C. and is obtainable by reduction of the 2'.3'-dichloro-phenylbenzoquinone melting at 147°–149° C. and formed by the reaction of diazotised 2.3-dichloraniline with benzoquinone) is transformed in a manner analogous to that described in Example 4 or 5, the 8-chloro-3-hydroxydiphenylene oxide which melts at 167°–169° C. or the 3.8-dihydroxy-diphenylene oxide melting at 194°–195° C. is obtained.

From the 2'.6'-dichloro-2.5-dihydroxydiphenyl (which melts at 134°–135° C. and is obtainable by reduction of the 2'.6'-dichlorophenyl-benzoquinone melting at 106°–108° C. and obtained from diazotised 2.6-dichloraniline and benzoquinone) the 5-chloro-3-hydroxy-diphenylene oxide melting at 148°–149° C. and the 3.5-dihydroxy-diphenylene oxide (melting point: 241°–242° C.) respectively, are obtained.

We claim:

1. The process of preparing 3-hydroxy-diphenylene oxides which comprises heating compounds of the following general formula

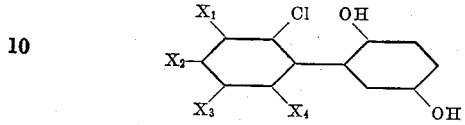

wherein $X_1$ and $X_4$ stand for members of the group consisting of hydrogen and chlorine, $X_2$ stands for a member of the group consisting of hydrogen, methyl, chlorine, methoxy and amino, and $X_3$ stands for a member of the group consisting of hydrogen, methyl, chlorine and methoxy, at least three X's being hydrogen, the fourth X being other than hydrogen, with an agent having an alkaline action selected from the group consisting of alkali metal hydroxides and alkali metal carbonates to a temperature of from substantially 170° C. to substantially 270° C.

2. The process of preparing 3-hydroxy-diphenylene oxides which comprises heating compounds of the following general formula

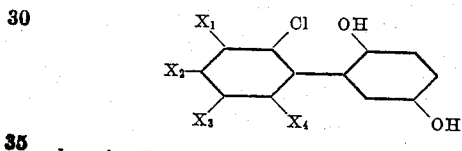

wherein $X_1$ and $X_4$ stand for members of the group consisting of hydrogen and chlorine, $X_2$ stands for a member of the group consisting of hydrogen, methyl, chlorine, methoxy and amino, and $X_3$ for a member of the group consisting of hydrogen, methyl, chlorine and methoxy, at least three X's being hydrogen, the fourth X being other than hydrogen, in the presence of sodium hydrosulphite with an agent having an alkaline action selected from the group consisting of alkali metal hydroxides and alkali metal carbonates to a temperature of from substantially 170° C. to substantially 270° C.

3. The 3-hydroxy-diphenylene oxides of the following general formula:

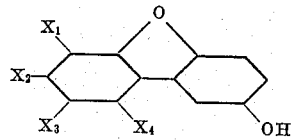

wherein $X_1$ and $X_4$ stand for members of the group consisting of hydrogen, chlorine and hydroxy, $X_2$ stands for a member of the group consisting of hydrogen, methyl, chlorine, hydroxy, methoxy and amino, $X_3$ for a member of the group consisting of hydrogen, methyl, chlorine and hydroxy, three X's being hydrogen, the fourth X being other than hydrogen.

4. The 7-methyl-3-hydroxy-diphenylene oxide of the following formula:

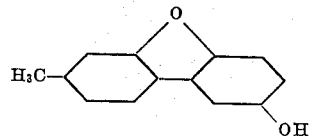

crystallising from toluene in the form of colourless needles melting at 147°–148° C.

5. The 6-methyl-3-hydroxy-diphenylene oxide of the following formula:

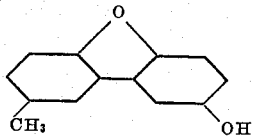

crystallising in the form of colourless needles melting at 160° C. to 161° C.

6. The 7-methoxy-3-hydroxy-diphenylene oxide of the following formula:

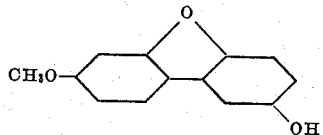

crystallising from toluene in the form of colourless crystals melting at 151° C. to 152° C.

KARL ZAHN.
KURT SCHIMMELSCHMIDT.